(12) United States Patent
Sigmund et al.

(10) Patent No.: US 8,478,239 B2
(45) Date of Patent: Jul. 2, 2013

(54) VIDEO GREETINGS FOR VOICEMAIL SYSTEMS

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/161,064

(22) PCT Filed: Jun. 20, 2008

(86) PCT No.: PCT/US2008/067591
§ 371 (c)(1),
(2), (4) Date: Jul. 16, 2008

(87) PCT Pub. No.: WO2009/029328
PCT Pub. Date: Mar. 5, 2009

(65) Prior Publication Data
US 2010/0159890 A1    Jun. 24, 2010

Related U.S. Application Data

(60) Provisional application No. 60/969,419, filed on Aug. 31, 2007.

(51) Int. Cl.
*H04M 1/725* (2006.01)
*H04M 11/10* (2006.01)
*H04M 11/00* (2006.01)

(52) U.S. Cl.
USPC ............... 455/412.1; 455/413; 379/88.13

(58) Field of Classification Search
USPC ................. 455/412.1, 412.2, 413; 379/88.13
See application file for complete search history.

(56) References Cited

U.S. PATENT DOCUMENTS

| 5,329,579 A | 7/1994 | Brunson |
| 5,524,137 A | 6/1996 | Rhee |

(Continued)

FOREIGN PATENT DOCUMENTS

| EP | 0 631 452 | 12/1994 |
| EP | 1 113 631 | 7/2001 |

(Continued)

OTHER PUBLICATIONS

U.S. Notice of Allowance dated May 26, 2011 in U.S. Appl. No. 12/201,945.

(Continued)

*Primary Examiner* — Kent Chang
*Assistant Examiner* — Scott Au
(74) *Attorney, Agent, or Firm* — Hartman & Citrin LLC

(57) ABSTRACT

A method for operating a voicemail system can include receiving a call at the voicemail system, wherein the call originates from a calling party device, determining if the calling party device is compatible with a video greeting feature, sending a video greeting to the called party device if it is determined that the calling party device is compatible with the video greeting feature, and recording a voicemail message received in response to the video greeting being played on the called party device. Another method can include sending a video greeting identifier to the called party device, the video greeting identifier being used to identify a video greeting stored on the calling party device. Methods for operating a mobile device and a voicemail system are also disclosed.

11 Claims, 8 Drawing Sheets

U.S. PATENT DOCUMENTS

| | | | |
|---|---|---|---|
| 5,572,578 A | 11/1996 | Lin et al. | |
| 5,737,394 A | 4/1998 | Anderson et al. | |
| 5,737,395 A | 4/1998 | Irribarren | |
| 5,809,111 A | 9/1998 | Matthews | |
| 6,005,870 A | 12/1999 | Leung et al. | |
| 6,108,559 A | 8/2000 | Astrom et al. | |
| 6,148,212 A | 11/2000 | Park et al. | |
| 6,246,871 B1 | 6/2001 | Ala-Laurila | |
| 6,335,962 B1 | 1/2002 | Ali et al. | |
| 6,351,523 B1 | 2/2002 | Detlef | |
| 6,360,272 B1 | 3/2002 | Lincke et al. | |
| 6,480,885 B1 | 11/2002 | Olivier | |
| 6,522,727 B1 | 2/2003 | Jones | |
| 6,751,298 B2 | 6/2004 | Bhogal et al. | |
| 6,829,334 B1 | 12/2004 | Zirngibl | |
| 6,879,847 B1 | 4/2005 | Kato | |
| 6,912,275 B1 | 6/2005 | Kaplan | |
| 6,937,868 B2 | 8/2005 | Himmel et al. | |
| 6,981,023 B1 | 12/2005 | Hamilton et al. | |
| 7,095,828 B1 | 8/2006 | Elliot et al. | |
| 7,142,648 B1 | 11/2006 | Miller | |
| 7,171,186 B2 | 1/2007 | Miyachi et al. | |
| 7,248,857 B1 | 7/2007 | Richardson et al. | |
| 7,277,529 B1 | 10/2007 | Wuthnow et al. | |
| 7,283,809 B1 | 10/2007 | Weinman | |
| 7,369,648 B1 | 5/2008 | Chang | |
| 7,680,491 B2 | 3/2010 | Zabawskyj et al. | |
| 7,738,833 B2* | 6/2010 | Bettis et al. | 455/3.04 |
| 7,796,977 B2 | 9/2010 | Vander Veen | |
| 7,826,831 B2* | 11/2010 | Bettis et al. | 455/414.3 |
| 7,894,580 B2 | 2/2011 | Veen et al. | |
| 8,320,535 B2 | 11/2012 | Alperin et al. | |
| 2002/0015403 A1 | 2/2002 | McConnell et al. | |
| 2002/0037075 A1 | 3/2002 | Flanagan | |
| 2002/0049768 A1 | 4/2002 | Peek et al. | |
| 2002/0077098 A1 | 6/2002 | Tilks et al. | |
| 2002/0112007 A1 | 8/2002 | Wood et al. | |
| 2002/0115429 A1 | 8/2002 | Deluca et al. | |
| 2003/0091169 A1 | 5/2003 | Cain | |
| 2003/0099341 A1 | 5/2003 | Williams | |
| 2003/0220784 A1 | 11/2003 | Fellenstein et al. | |
| 2004/0023643 A1 | 2/2004 | Vander Veen et al. | |
| 2004/0081088 A1 | 4/2004 | Schinner et al. | |
| 2004/0139471 A1* | 7/2004 | Geen et al. | 725/106 |
| 2004/0146147 A1 | 7/2004 | Picard et al. | |
| 2004/0248594 A1* | 12/2004 | Wren, III | 455/465 |
| 2004/0252679 A1 | 12/2004 | Williams et al. | |
| 2004/0264658 A1 | 12/2004 | Cline et al. | |
| 2005/0089149 A1* | 4/2005 | Elias | 379/88.13 |
| 2005/0102368 A1 | 5/2005 | Forman et al. | |
| 2005/0113078 A1 | 5/2005 | Deitrich | |
| 2005/0186944 A1 | 8/2005 | True et al. | |
| 2005/0213715 A1 | 9/2005 | Winick | |
| 2006/0003745 A1 | 1/2006 | Gogic | |
| 2006/0025114 A1 | 2/2006 | Bales et al. | |
| 2006/0025140 A1 | 2/2006 | Bales et al. | |
| 2006/0031470 A1 | 2/2006 | Chen et al. | |
| 2006/0059361 A1 | 3/2006 | Paden | |
| 2006/0062356 A1 | 3/2006 | Vendrow | |
| 2006/0171511 A1 | 8/2006 | Liu et al. | |
| 2006/0173959 A1 | 8/2006 | McKelvie et al. | |
| 2006/0239419 A1 | 10/2006 | Joseph et al. | |
| 2006/0251222 A1 | 11/2006 | Abramson et al. | |
| 2006/0253584 A1 | 11/2006 | Dixon et al. | |
| 2006/0281443 A1 | 12/2006 | Chen et al. | |
| 2007/0038483 A1 | 2/2007 | Wood | |
| 2007/0066284 A1 | 3/2007 | Gatzke et al. | |
| 2007/0127632 A1 | 6/2007 | Swingle et al. | |
| 2007/0127663 A1 | 6/2007 | Bae | |
| 2007/0140443 A1 | 6/2007 | Woodring | |
| 2007/0143106 A1 | 6/2007 | Dunsmuir | |
| 2007/0173233 A1 | 7/2007 | Vander Veen et al. | |
| 2007/0180032 A1 | 8/2007 | Pearson | |
| 2007/0180504 A1 | 8/2007 | Hung | |
| 2007/0207785 A1 | 9/2007 | Chatterjee et al. | |
| 2007/0213050 A1 | 9/2007 | Jiang | |
| 2007/0223666 A1* | 9/2007 | Teague | 379/162 |
| 2007/0287453 A1* | 12/2007 | Wang | 455/435.1 |
| 2008/0008163 A1 | 1/2008 | Castell et al. | |
| 2008/0008299 A1 | 1/2008 | Didcock et al. | |
| 2008/0056459 A1 | 3/2008 | Vallier et al. | |
| 2008/0062246 A1* | 3/2008 | Woodworth et al. | 348/14.01 |
| 2008/0062938 A1 | 3/2008 | Gil-soo et al. | |
| 2008/0081609 A1 | 4/2008 | Burgan et al. | |
| 2008/0140767 A1 | 6/2008 | Rao et al. | |
| 2008/0167007 A1 | 7/2008 | Novick et al. | |
| 2008/0167010 A1* | 7/2008 | Novick et al. | 455/413 |
| 2008/0167014 A1 | 7/2008 | Novick et al. | |
| 2008/0188204 A1 | 8/2008 | Gavner et al. | |
| 2008/0200152 A1 | 8/2008 | Moore | |
| 2008/0207176 A1 | 8/2008 | Brackbill et al. | |
| 2008/0243513 A1 | 10/2008 | Bucchieri et al. | |
| 2008/0260118 A1 | 10/2008 | Lyle | |
| 2008/0298459 A1 | 12/2008 | Yang et al. | |
| 2008/0300873 A1 | 12/2008 | Siminoff | |
| 2009/0149220 A1 | 6/2009 | Camilleri et al. | |
| 2009/0239507 A1 | 9/2009 | Sigmund et al. | |
| 2009/0253407 A1 | 10/2009 | Sigmund et al. | |
| 2009/0253412 A1 | 10/2009 | Sigmund et al. | |
| 2009/0253413 A1 | 10/2009 | Sigmund et al. | |
| 2010/0159886 A1 | 6/2010 | Sigmund et al. | |
| 2010/0159888 A1 | 6/2010 | Sigmund et al. | |
| 2010/0159889 A1 | 6/2010 | Sigmund et al. | |
| 2010/0159891 A1 | 6/2010 | Sigmund et al. | |
| 2010/0166161 A1 | 7/2010 | Dhawan et al. | |
| 2010/0167699 A1 | 7/2010 | Sigmund et al. | |
| 2010/0189229 A1 | 7/2010 | Sigmund et al. | |
| 2010/0195807 A1 | 8/2010 | Sigmund et al. | |
| 2010/0222024 A1 | 9/2010 | Sigmund et al. | |
| 2011/0085646 A1 | 4/2011 | Sigmund et al. | |

FOREIGN PATENT DOCUMENTS

| | | |
|---|---|---|
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.

U.S. Official Action dated Apr. 25, 2012 in U.S. Appl. No. 12/477,971.

U.S. Official Action dated Oct. 13, 2011 in U.S. Appl. No. 12/485,335.

U.S. Official Action dated Apr. 27, 2012 in U.S. Appl. No. 12/160,931.

U.S. Official Action dated Dec. 22, 2010 in U.S. Appl. No. 12/160,940.

U.S. Official Action dated May 31, 2011 in U.S. Appl. No. 12/160,940.

U.S. Official Action dated Apr. 26, 2012 in U.S. Appl. No. 12/160,946.

U.S. Official Action dated Nov. 4, 2011 in U.S. Appl. No. 12/160,956.

U.S. Official Action dated Jan. 12, 2011 in U.S. Appl. No. 12/161,021.

U.S. Official Action dated Jun. 1, 2011 in U.S. Appl. No. 12/161,021.

U.S. Official Action dated Dec. 15, 2011 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Office Action dated May 22, 2012 in U.S. Appl. No. 12/485,335.
U.S. Office Action dated Jun. 6, 2012 in U.S. Appl. No. 12/161,033.
U.S. Office Action dated Apr. 24, 2012 in U.S. Appl. No. 12/160,940.
U.S. Office Action dated Jun. 6, 2012 in U.S. Appl. No. 12/160,956.
U.S. Notice of Allowance dated Jun. 21, 2012 in U.S. Appl. No. 12/161,021.
U.S. Notice of Allowance dated Jul. 17, 2012 in U.S. Appl. No. 12/161,076.
U.S. Office Action dated Jul. 18, 2012 in U.S. Appl. No. 12/161,035.
U.S. Office Action dated Jul. 30, 2012 in U.S. Appl. No. 12/161,027.
U.S. Notice of Allowance dated Jul. 24, 2012 in U.S. Appl. No. 12/161,033.
U.S. Office Action dated Aug. 30, 2012 in U.S. Appl. No. 12/160,931.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Oct. 11, 2012 in U.S. Appl. No. 12/160,956.
U.S. Notice of Allowance dated Nov. 16, 2012 in U.S. Appl. No. 12/161,027.
U.S. Notice of Allowance dated Oct. 25, 2012 in U.S. Appl. No. 12/160,940.
U.S. Notice of Allowance dated Nov. 23, 2012 in U.S. Appl. No. 12/485,335.
U.S. Notice of Allowance dated Nov. 21, 2012 in U.S. Appl. No. 12/477,971.
U.S. Notice of Allowance dated Dec. 27, 2012 in U.S. Appl. No. 13/616,198.
U.S. Office Action dated Feb. 28, 2013 in U.S. Appl. No. 13/654,480.
U.S. Notice of Allowance dated Jan. 31, 2013 in U.S. Appl. No. 12/485,961.

* cited by examiner

VIDEO GREETINGS FOR VOICEMAIL SYSTEMS

RELATED APPLICATION

This application claims priority to U.S. Provisional Patent Application No. 60/969,419, filed Aug. 31, 2007, the entirety of which is hereby incorporated by reference.

TECHNICAL FIELD

The present disclosure relates generally to voicemail systems and, more particularly, to video greetings for voicemail systems.

BACKGROUND

Voicemail systems allow a caller to leave a voice message if the desired recipient is unavailable. When a called line with voicemail functionality does not answer or is busy, a call can be forwarded to a voicemail system. When a call is forwarded to a voicemail system, the voicemail system can play one or more audio recordings and/or audio announcements for the calling party or a generic audio message and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message or data and associated call data.

SUMMARY

A method for operating a voicemail system can include receiving a call at the voicemail system, wherein the call originates from a calling party device, determining if the calling party device is compatible with a video greeting feature, sending a video greeting to the called party device, if it is determined that the calling party device is compatible with the video greeting feature, and recording a voicemail message received in response to the video greeting being played on the called party device. If it is determined that the calling party device is not compatible with the video greeting feature, the voicemail system can play an audio greeting and record a voicemail message dictated by the calling party. The method can further include determining if the video greeting feature is enabled for a voicemail account associated with a called party.

In one embodiment, determining if the calling party device is compatible with a video greeting feature can be based upon information stored within the voicemail system. In an alternative embodiment, determining if the calling party device is compatible with a video greeting feature can be based upon information stored within a network entity that is in communication with the voicemail system, wherein the network entity includes at least one of a server and a database.

In one embodiment, sending the video greeting to the calling party device can include sending the video greeting to the calling party device via a data session established between the calling party device and the voicemail system and at least temporarily storing the video greeting on the calling party device. In an alternative embodiment, sending the video greeting to the calling party can include sending the video greeting to the calling party device in a video stream.

Another method for operating a voicemail system can include receiving a call at the voicemail system, wherein the call originates from a calling party device, determining if a video greeting is stored on the calling party device, sending a video greeting identifier to the calling party device, if it is determined that the video greeting is stored on the calling party device, wherein the video greeting identifier is used to identify the video greeting stored on the calling party device, and recording a voicemail message received in response to the video greeting being played on the called party device. If it is determined that the calling party device is not compatible with the video greeting feature, the voicemail system can play an audio greeting and record a voicemail message received in response to the audio greeting. If it is determined that the video greeting is not available on the calling party device, the voicemail system can send the video greeting to the calling party device and the video greeting can be played on the calling party device. The method can further include determining if the video greeting feature is enabled for a voicemail account associated with a called party.

In one embodiment, determining if the video greeting is available on the calling party device can include determining if the video greeting is available based upon video greeting information comprising an MSISDN of one or more calling parties and an indication as to whether the video greeting has been saved on the corresponding calling party device. The video greeting information can be retrieved from at least one of the voicemail system, a subscriber database, a database, a server, and a network entity. In an alternative embodiment, determining if the video greeting is stored on the calling party device can include querying the calling party device to determine if the video greeting is available.

A method for operating a mobile device can include receiving a selection of one of a saved video greeting and an option to record a new video greeting, recording a new video greeting, if the option to record a new video greeting is selected, and sending one of the saved video greeting and the new video greeting to a voicemail system.

Another method for operating a mobile device can include receiving at least one of a video greeting and a video greeting identifier. If the video greeting is received, the mobile device can play the video greeting and, if the video greeting identifier is received, the mobile device can determine which of one or more stored video greetings is identified by the video greeting identifier and play the stored video greeting that corresponds to the video greeting identifier.

A voicemail system can include a telephony server that is configured to handle calls received at the voicemail system and a storage server that is configured to store at least one voicemail account and at least one of one or more video greetings and one or more video greeting identifiers associated with the at least one voicemail account.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
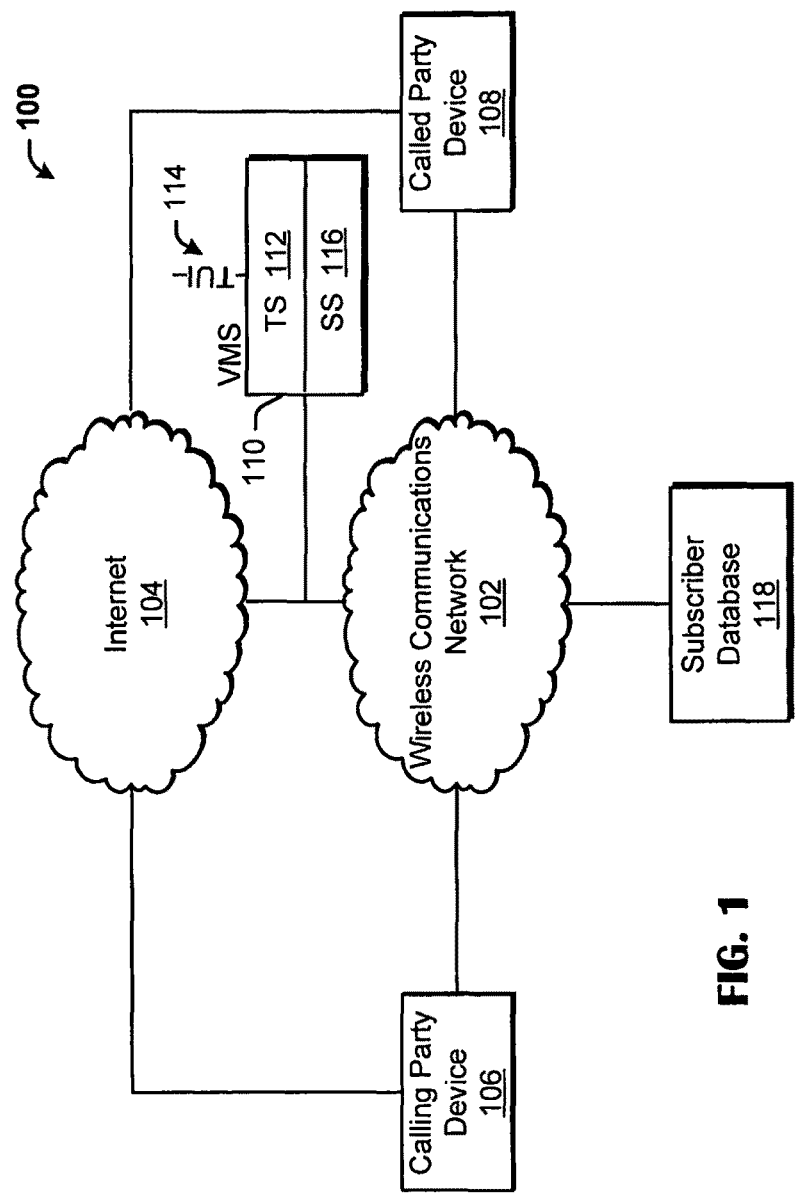
FIG. 1 schematically illustrates an exemplary communications network in which embodiments of the present disclosure can be implemented.

Referring now to the drawings wherein like numerals represent like elements throughout the several views, FIG. 1 illustrates an exemplary communications network 100 for implementing various aspects of the present disclosure. The illustrated communications network 100 includes a wireless communications network 102 that is in communication with the Internet 104.

By way of example, the wireless communications network 102 can be configured as a 2G GSM (Global System for Mobile communications) network and provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 102 is also compatible with future mobile communications standards including, but not limited to, pre-4G and 4G standards, for example. Moreover, the wireless communications network 102 can be configured for providing messaging services via Short Message Service (SMS), Multimedia Message Service (MMS), instant messaging, and voicemail messaging including plain old voicemail (POVM) and visual voicemail (VVM). As such, embodiments are described herein in context of one or more of these messaging technologies.

The wireless communications network 102 can include radio access network (RAN) components and core network components for circuit-switched and packet-switched communications. Advanced architectures, such as Internet Protocol Multimedia Subsystem (IMS) are also contemplated. SMS over IP and MMS over IP are also contemplated The wireless communications network 102 is illustrated as being in communication with a calling party device 106. The calling party device 106 can be any device capable of communication with one or both of the wireless communications network 102 and the Internet 104. For example, the calling party device 106 can be a cellular telephone, a Wi-Fi telephone, a VoIP telephone with messaging capabilities, a dual or multi-mode telephone, a computer, a personal digital assistant, a handheld computer, a gaming system, and the like. The calling party device 106 can be operated by a calling party, that is, the user of the calling party device 106. Generally, the calling party device 106 can be configured to receive, store, and/or play a video greeting.

The calling party device 106 can communicate with one or more called party devices 108 via at least one of the wireless communications network 102 and the Internet 104. The calling party device 106 can communicate with a voicemail system (VMS) 110 to manage a voicemail account associated with the calling party. The VMS 110 can be a POVM system (POVMS) and/or a WM system (VVMS). Furthermore, the calling party can be prompted to record a message for a called party, operating one of the called party devices 108, if the called party is unavailable. The called party device 108 can be any device capable of communication with one or both of the wireless communications network 102 and the Internet 104. For example, the called party device 108 can be a cellular telephone, a Wi-Fi telephone, a VoIP telephone with messaging capabilities, a dual or multi-mode telephone, a computer, a personal digital assistant, a handheld computer, a gaming system, and the like. Generally, the called party device 108 can be configured to store, record, and/or send a video greeting to a voicemail account associated with the called party. A called party can select a video greeting directly from the called party device 108 for use by the VMS 110 when a calling party accesses the called party's voicemail account. Furthermore, the called party can assign a video greeting to one or more contacts in a contact list stored in the called party device 108.

The VMS 110 can include a telephony server (TS) 112 for handling incoming voicemail inquiries via a telephone user interface (TUI) 114, and a storage server (SS) 116 for storing and managing voicemail messages, audio greetings, and video greetings for a plurality of voicemail accounts. The VMS 110 can be a POVMS and/or a VVMS.

The illustrated communications network 100 further includes a subscriber database 118. The subscriber database 118 can be configured to store and manage subscriber data, such as, for example, account information, billing information, services information, such as a voicemail video greeting service, equipment information, such as device capabilities, International Mobile Subscriber Identity (IMSI), International Mobile Equipment Identity (IMEI), location information, combinations thereof, and the like. In addition or in the alternative, the subscriber database 118 can be configured as a location register, such as Home Location Register (HLR). The HLR can be configured to provide routing information for mobile-terminated calls, SMS messages, MMS messages, and the like.

To avoid complicating disclosure, the following description will describe, in general terms, performance of various methods and GUIs embodying various concepts of the disclosure. In reading the description of the several methods and GUIs herein, it should be understood that a user can interact with the VMS 110 using a TUI 114, a GUI, or another UI, such as a web UI, for example. Alternatively, a user can interact with a device 106, 108 and the device 106, 108 can handle all communication needed to instruct the VMS 110 how to carry out the user's desired actions. Therefore, DMTF-driven TUIs, icon-based GUIs, touch-sensitive screen GUIs, voice-driven TUIs, and the like are included in the following description and are included in the scope of the appended claims. Methods of several embodiments are described with reference to FIGS. 3-6 and GUI implementations of two embodiments of the present disclosure are described with reference to FIGS. 7 and 8.

Figure 2:
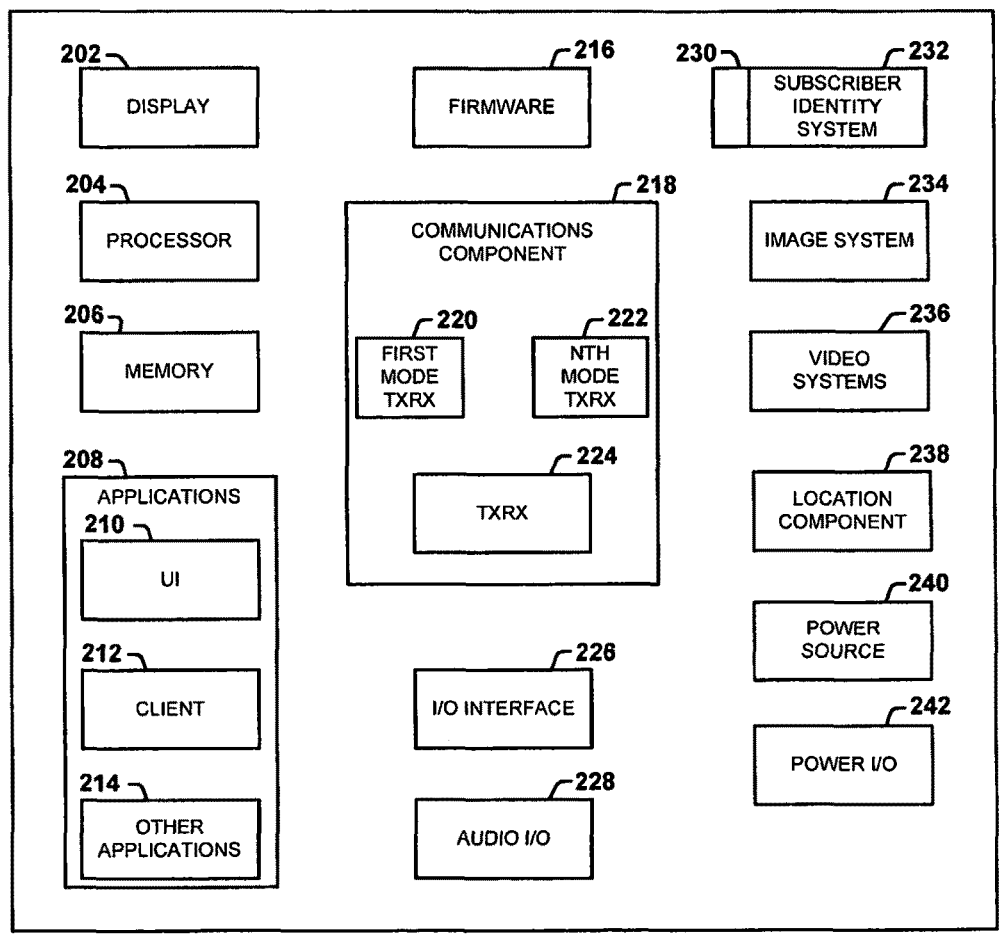
FIG. 2 schematically illustrates an exemplary mobile device and components thereof, according to an embodiment of the present disclosure.

FIG. 2 is a schematic block diagram illustrating an exemplary mobile device 200 for use in accordance with an exemplary embodiment of the present disclosure. The mobile device 200 is an exemplary mobile device that can be representative of the calling party device 106 and/or a called party device 108. As such, portions of the remaining description are described with reference to a device 200, which can be interpreted to mean at least one of the calling party device 106 and a called device 108 depending upon the context. Although no connections are shown between the components illustrated and described in FIG. 2, the components can interact with each other to carry out device functions.

As illustrated, the mobile device 200 can be a multimode handset. FIG. 2 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The illustrated device 200 includes a display 202 for displaying multimedia such as, for example, text, images, video, and telephony functions, such as, visual voicemail data, caller line ID data, setup functions, menus, music metadata, messages, wallpaper, graphics, and the like.

The device 200 can include a processor 204 for controlling, and/or processing data. A memory 206 can interface with the processor 204 for the storage of data and/or applications 208. The memory 206 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 200.

The memory 206 can be configured to store one or more applications 208. The applications 208 can also include a user interface (UI) application 210. The UI application 210 can interface with a client 212 (e.g., an operating system) to facilitate user interaction with device functionality and data, for example, recording audio and/or video greetings, sending recorded audio and/or video greetings to the VMS 110, answering/initiating calls, entering/deleting data, configuring settings, address book manipulation, multimode interaction, and the like. The applications 208 can include other applications 214, such as, for example, a visual voicemail application, an audio recording application, an audio processing application, a video recording application, a video processing application, add-ons, plug-ins, a voice recognition application, a call voice processing application, an SMS messaging application, an MMS messaging application, an e-mail messaging application, an instant messaging application, an image processing application, a music application, combinations thereof, and the like, as well as subsystems and/or components. The applications 208 can be stored in the memory 206 and/or in a firmware 216, and can be executed by the processor 204. The firmware 216 can also store code for execution during initialization of the device 200.

A communications component 218 can interface with the processor 604 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 218 can also include a multimode communications subsystem for providing cellular communications via different cellular technologies. For example, a first cellular transceiver 220 can operate in one mode, for example, GSM, and an Nth transceiver 222 can operate in a different mode, for example WiFi. While only two transceivers 220, 222 are illustrated, it should be appreciated that a plurality of transceivers can be included. The communications component 218 can also include a transceiver 224 for unlicensed RF communications using technology such as, for example, WiFi, WiMAX, NFC, other RF and the like. The transceiver 224 can also be configured for line-of-sight technologies, such as, for example, infrared and IRDA. Although a single transceiver 224 is illustrated multiple transceivers for unlicensed RF and line-of-sight technologies are contemplated.

The communications component 218 can also facilitate communications reception from terrestrial radio networks, digital satellite radio networks, Internet-based radio services networks, combinations thereof, and the like. The communications component 218 can process data from a network, such as, for example, the Internet, a corporate intranet, a home broadband network, and the like, via an ISP, DSL provider, or other broadband service provider.

An input/output (I/O) interface 226 can be provided for input/output of data and/or signals. The I/O interface 226 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 228 that can include a speaker (not shown) for the output of audio signals and a microphone (not shown) to collect audio signals.

The device 200 can include a slot interface 230 for accommodating a subscriber identity system 232, such as, for example, a SIM or universal SIM (USIM). The subscriber identity system 232 instead can be manufactured into the device 200, thereby obviating the need for a slot interface 230.

The device 200 can include an image capture and processing system 234. Photos and/or videos can be obtained via an associated image capture subsystem of the image system 234, for example, a camera. The device 200 can also include a video systems component 236 for processing, recording, and/or transmitting video content, such as, video greetings, for example. The video system 236 can cooperate with the audio I/O component 228 to create video with sound, and the sound and video files can be combined, for example.

A location component 238 can be included to send and/or receive signals, such as, for example, GPS data, assisted GPS data, triangulation data, combinations thereof, and the like. The device 200 can use the received data to identify its location or can transmit data used by other devices to determine the device 200 location.

The device 200 can include a power source 240 such as batteries and/or other power subsystem (AC or DC). The power source 240 can be single-use, continuous, or rechargeable. In the case of the latter, the power source 240 can interface with an external power system or charging equipment via a power I/O component 242.

Figure 3:
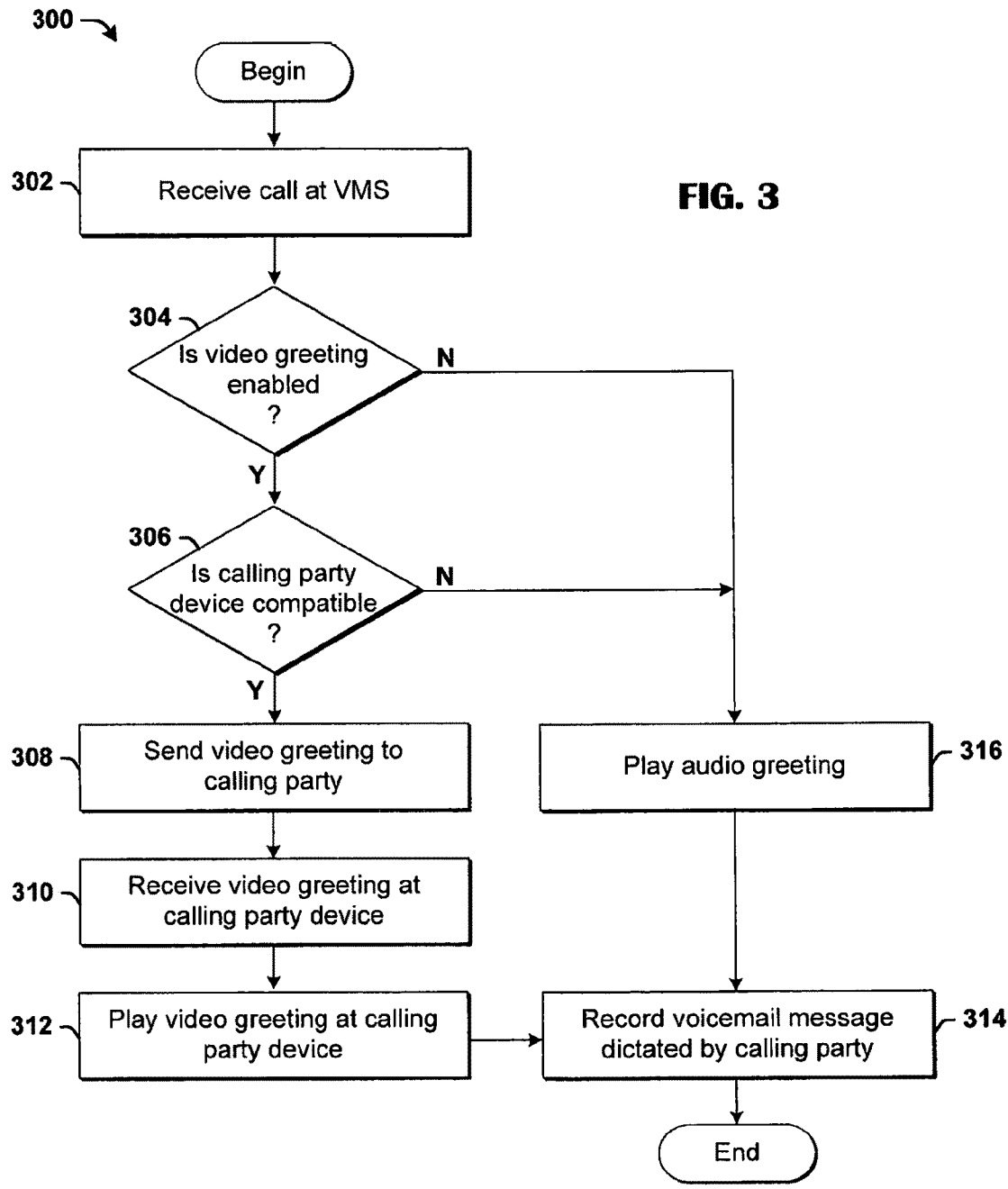
FIG. 3 schematically illustrates a method for operating a voicemail system that supports video greetings, according to an exemplary embodiment of the present disclosure.

Referring now to FIG. 3, a method 300 for operating a voicemail system 110 that supports video greetings is illustrated, according to an exemplary embodiment of the present disclosure. It should be understood that the steps of the method 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. Some or all steps of this process, and/or substantially equivalent steps, can be performed by execution of computer-readable instructions included on a computer readable medium.

The method 300 begins and flow proceeds to block 302 wherein a call is received at the VMS 110. Flow then proceeds to block 304 wherein it is determined if a video greeting feature is enabled for the called party's voicemail account. A video greeting feature can be enabled via the TUI 114, by a network operator or device, and/or a GUI for a voicemail application operating on a device 200. Assuming the video greeting feature is enabled, flow proceeds to block 306 wherein it can be determined if the calling party device 106 is compatible with the video greeting feature.

In one embodiment, the VMS 110 can include a look-up table that includes the telephone number associated with the calling party device 106 and an indication as to the compatibility of the calling party device 106 with the video greeting feature. The VMS 110 can retrieve the compatibility information from the subscriber database 118 and store the compatibility information in the SS 116, for example. The compatibility information can be stored in the SS 116 for the most recent calling parties, most frequent calling parties, a group of calling parties selected by the called party, and a group of calling parties selected by the VMS 110, for example. In another embodiment, the VMS 110 can query the subscriber database 118 to retrieve the compatibility information each time a call is forwarded to the VMS 110. Other network entities, such as servers and databases, can be used to store compatibility information for one or more voicemail subscribers, store one or more video greetings, and store other related information.

At block 308, the VMS 110 can send a video greeting to the calling party device 106. The VMS 110 can send a generic video voicemail greeting selected for all calling parties or a custom video greeting selected for one or more calling parties. At block 310, the calling party device 106 can receive the video greeting and the video greeting can be played, at block 312.

In blocks 308, 310, the VMS 110 can establish a data session with the calling party device 106 to transfer the video greeting. However, some devices may not be capable of simultaneous voice and data connections. For these devices, the video greeting can be played and a voice connection can be reestablished following the completion of the video greeting playback. The voice connection can be reestablished with the VMS 110 and the calling party can be prompted to record a voicemail message.

A video greeting can be received at the calling party device 106 and converted to a format used by the calling party device 106. The video greeting can be played in one format and saved on the calling party device 106 in another format or multiple formats. The video greeting can be provided sent in multiple formats and a format can be selected by the calling party or by the calling party device 106, for example, based upon a preference.

In one embodiment, the data session can be established in addition to the voice session previously established. In another embodiment, the voice session can be terminated and the data session can be established. After the video greeting is transferred, the data session can be terminated and the voice session can be used to prompt the calling party to record a voicemail message. Alternatively, the data session can be terminated and a new voice session can be established. In the latter embodiment, the new voice session can be established automatically or manually. Further, the calling party device 106 can be connected to the VMS 110 and the VMS 110 can prompt the calling party to record a voicemail message. In this example, the VMS 110 can be configured to bypass any greeting and prompt the calling party to record a message. This eliminates the calling party from having to navigate through a menu and listen to and/or view another greeting message. The VMS 110 can record a voicemail message, at block 314. The method 300 can end.

If it is determined, at block 304, that the video greeting feature is not enabled for the called party's voicemail account, flow can proceed to block 316 wherein an audio voicemail greeting can be played for the calling party and the calling party can be prompted to record a voicemail message. The VMS 110 can record a voicemail message, at block 314. The method 300 can end.

Likewise, if it is determined, at block 306, that the calling party device is not compatible with the video greeting feature, flow can proceed to block 316 wherein an audio voicemail greeting can be played for the calling party and the calling party can be prompted to record a voicemail message. The VMS 110 can record a voicemail message, at block 314. The method 300 can end.

Figure 4:
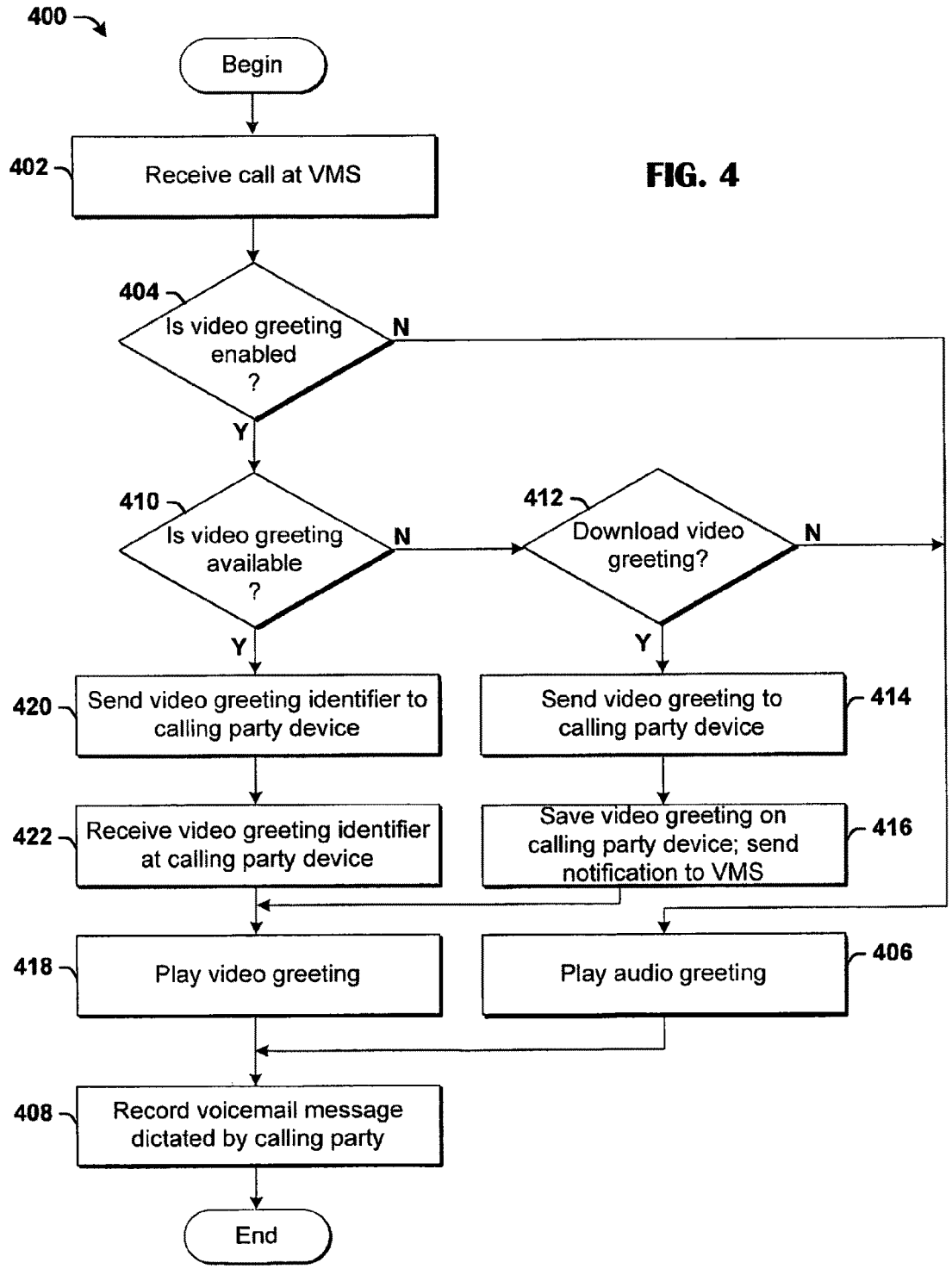
FIG. 4 schematically illustrates a method for operating a voicemail system that supports video greetings, according to another exemplary embodiment of the present disclosure.

Referring now to FIG. 4, a method 400 for operating a voicemail system 110 that supports video greetings is illustrated, according to another exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins and flow proceeds to block 402 wherein a call is received at the VMS 110. Flow can proceed to block 404 wherein it is determined if a video greeting feature is enabled on the calling party device 106. A video greeting feature can be enabled via the TUI 114 and/or a GUI for a voicemail application operating on a device 200. Assuming the video greeting feature is enabled, flow proceeds to block 506 wherein a determination is made if the calling party device 106 is compatible with the video greeting feature. If it is determined at block 404 that the video greeting feature is not enabled for the called party's voicemail account, flow can proceed to block 406, wherein an audio greeting can be played for the calling party. The VMS 110 can record a voicemail message, at block 408. The method 400 can end.

If it is determined, at block 404, that the video greeting feature is enabled for the called party's voicemail account, flow can proceed to block 410, wherein it is determined if a video greeting is available on the calling party device 106. The VMS 110 can be configured to store an indication of the availability (i.e., available or not available) of at least one video greeting on one or more calling party devices 106. In this embodiment, a calling party device 106 can download a video greeting for at least one called party, for example, in accordance with the embodiments described above with reference to FIG. 3 and store the video greeting in a memory 206. The calling party device 106 can send a notification to the VMS 110 to confirm receipt of a video greeting. Additionally, if a video greeting is deleted from the calling party device 106, a notification can be sent to the VMS 110 to confirm deletion of the video greeting. In one embodiment, this determination can be made based upon information stored in the called party's voicemail account that identifies the MSISDN of one or more calling parties and an indication as to whether a video voicemail greeting has been saved on the corresponding calling party device 106. This and other related information can be stored in the subscriber database 118 or another database, server, or other network node or entity that is in communication with the VMS 110.

Alternatively, the VMS 110 can query the calling party device 106 to determine if a video greeting is available on the calling party device 106. The query can include, for example, a video greeting identifier. If the video greeting identifier is not available on the calling party device 106, then it can be assumed that the video greeting is not available. A filename and/or file type query can also be used. Further, the VMS 110 can prompt the calling party to confirm if a video greeting for the called party is stored on the calling party device 106.

If it is determined, at block 410, that a video greeting is not available on the calling party device 106, flow can proceed to block 412, wherein the calling party can be provided with the option to download a video greeting. If the calling party elects not to download a video greeting, flow can proceed to block 406 wherein an audio greeting can be played for the calling party. The VMS 110 can record a voicemail message, at block 408, and the method 400 can end. However, if the calling party elects to download a video greeting, the VMS 110 can send a video greeting to the calling party device 106, at block 414. Flow can proceed to block 416 wherein the video greeting can be saved on the calling party device 106 and the calling party device 106 can generate and send a notification to the VMS 110 to confirm receipt and storage of the video greeting. The called party's voicemail account can be updated to reflect that a video greeting is stored on the calling party device 106. Alternatively, the VMS 110 can update the voicemail account prior to sending the video greeting. Flow can proceed to block 418, wherein the video greeting can be played on the calling party device 106. The VMS 110 can record a voicemail message, at block 408, and the method 400 can end.

If it is determined, at block 410, that a video greeting is available on the calling party device 106, flow can proceed to block 420, wherein a video greeting identifier can be sent to the calling party device 106. At block 422, the video greeting identifier can be received and the corresponding video greeting can be played, at block 418. The VMS 110 can record a voicemail message, at block 408, and the method 400 can end.

Figure 5:
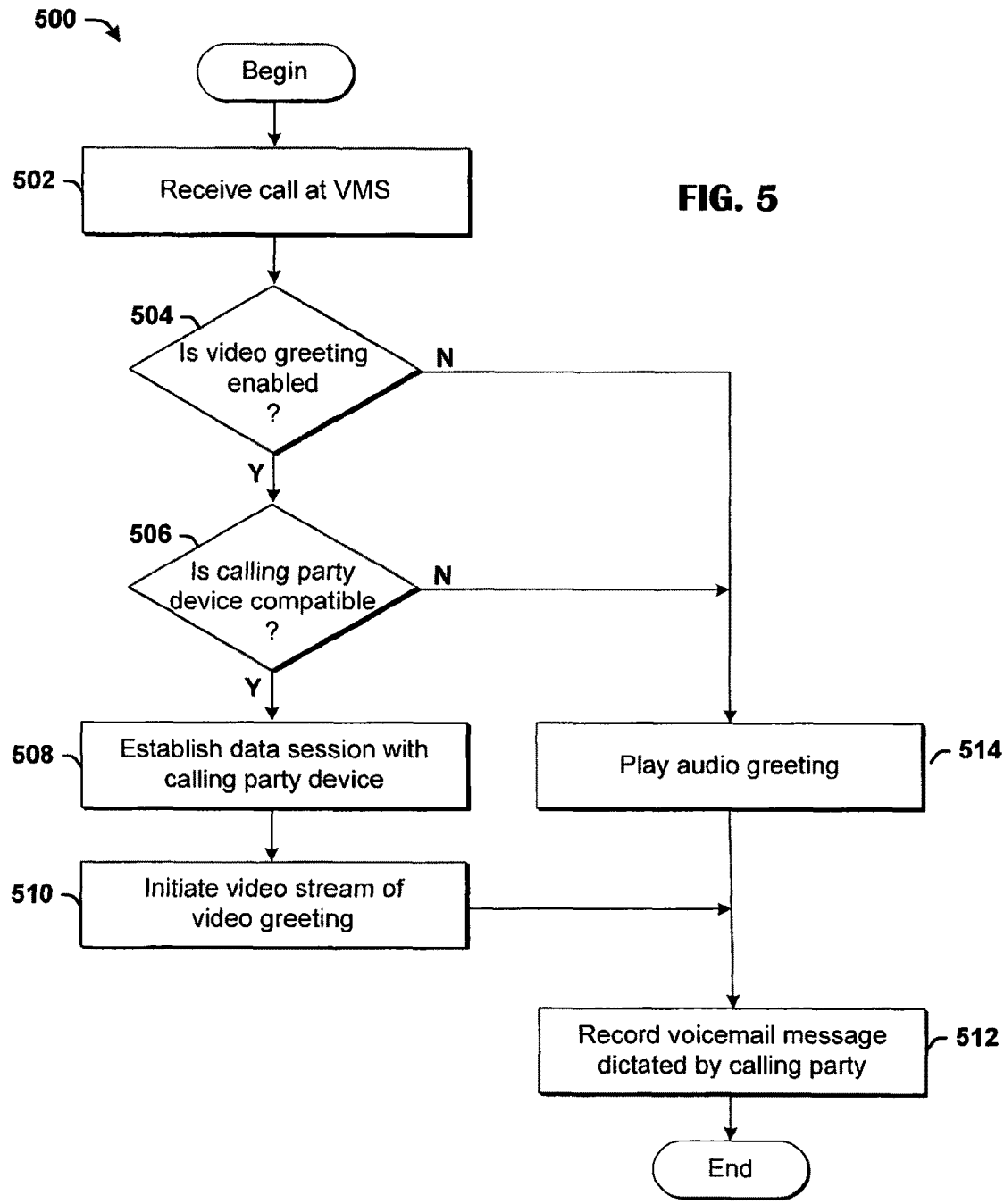
FIG. 5 schematically illustrates a method for operating a voicemail system that supports video greetings, according to another exemplary embodiment of the present disclosure.

Referring now to FIG. 5, another method 500 for operating a voicemail system that supports video greetings is illustrated, according to an exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

The method 500 begins and flow proceeds to block 502 wherein a call is received at the VMS 110. Flow can proceed to block 504 wherein it is determined if a video greeting feature is enabled for the called party's voicemail account. A video greeting feature can be enabled via the TUI 114 and/or a GUI for a voicemail application operating on a device 200. Assuming the video greeting feature is enabled, flow proceeds to block 506 wherein a determination is made if the calling party device 106 is compatible with the video greeting feature.

In one embodiment, the VMS 110 includes a look-up table that includes the telephone number associated with the calling party device and an indication as to the compatibility of the calling party device 106 with the video greeting feature. The VMS 110 can retrieve the compatibility information from the subscriber database 118 and store the compatibility information in the SS 116. It is contemplated that the compatibility information can be stored in the SS 116 for the most recent calling parties, most frequent calling parties, a group of calling parties selected by the called party, and a group of calling parties selected by the VMS 110, for example. In another embodiment, the VMS 110 can query the subscriber database 118 to retrieve the compatibility information each time a call is forwarded to the VMS 110.

If it is determined, at block 506, that the calling party device 106 is compatible with the video greeting feature, flow can proceed to block 508, wherein a data session can be established between the VMS 110 and the calling party device 106. In one embodiment, the data session can be established in addition to the voice session previously established. In another embodiment, the voice session can be terminated and the data session can be established.

At block 510, the VMS 110 can initiate a video stream of the video greeting. At the end of the video stream the data session can be terminated and the voice session can be used to prompt the calling party to record a voicemail message. Alternatively, the data session can be terminated and a new voice session can be established. In the latter embodiment, the new voice session can be established automatically or manually. Further, the calling party device 106 can be connected to the VMS 110 and the VMS 110 can prompt the calling party to record a voicemail message. In this example, the VMS 110 can be configured to bypass any greeting and prompt the calling party to record a message. This eliminates the calling party from having to navigate through a menu and listen to and/or view another greeting message. The VMS 110 can record a voicemail message, at block 512, and the method 500 can end.

If it is determined, at block 504, that the video greeting feature is not enabled, flow can proceed to block 514, wherein an audio greeting can be played for the calling party. The VMS 110 can record a voicemail message, at block 512, and the method 500 can end.

If it is determined, at block 506 that the calling party device 106 is not compatible with the video greeting feature, flow can proceed to block 514, wherein an audio greeting can be played for the calling party. The VMS 110 can record a voicemail message, at block 512, and the method 500 can end.

Figure 6:
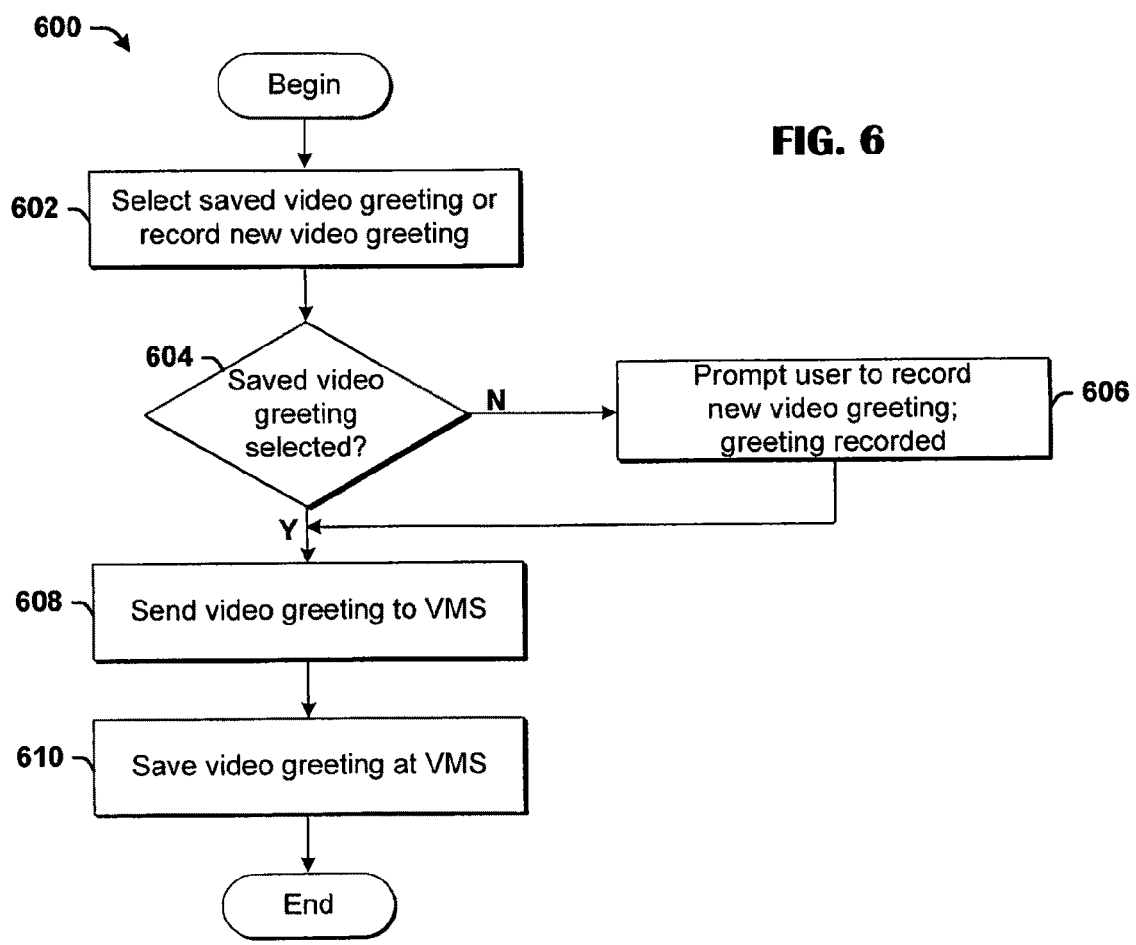
FIG. 6 schematically illustrates a method for operating a mobile device that supports video greetings, according to an exemplary embodiment of the present disclosure.

Referring now to FIG. 6, a method for operating a mobile device 200 that supports video greetings is illustrated, according to an exemplary embodiment of the present disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

The method 600 can begin and flow can proceed to block 602, wherein a user of the mobile device 200 can select a saved video greeting or select an option to record a new video greeting. At block 604, it is determined if a saved video greeting was selected. If the user selects the option to record a new video greeting, flow can proceed to block 606, wherein the user is prompted to record a new video greeting and a new video greeting is recorded. The video greeting can be recorded utilizing a video camera built-in to the mobile device 200, such as the video systems component 236, or can be recorded utilizing an external video camera connected to the mobile device 200 via a wired or wireless connection, for example. Sound for the video can be recorded using the audio I/O component 228, as explained above. In any case, after the new video greeting is recorded, the mobile device 200 can upload the new video greeting to the VMS 110, at block 608. At block 610, the VMS 110 can save the new video greeting and update the user's voicemail account. The method 600 can end.

If it is determined that a saved video greeting was selected at block 604, flow can proceed directly to block 608 wherein the mobile device 200 can upload the new video greeting to the VMS 110 and the VMS 110 can save the new video greeting and update the user's voicemail account, at block 610. The method 600 can end.

The video greeting can be in any format. Video data exemplary formats include, but are not limited to, MPEG-4, MPEG-2, MPEG-1, H.261, H.263, H.264, WMV, flash video, Sorenson, Sorenson Spark, DivX, x264, Cinepak, RealVideo, VC-1, other versions, improvements, variations, or evolutions thereof, and the like.

Further, the audio data accompanying the video can be in any format. Audio data exemplary formats include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAG), Apple® lossless encoder (ALE), i.e., Apple® lossless audio codec (ALAC), and other open and proprietary audio formats.

Figure 7:
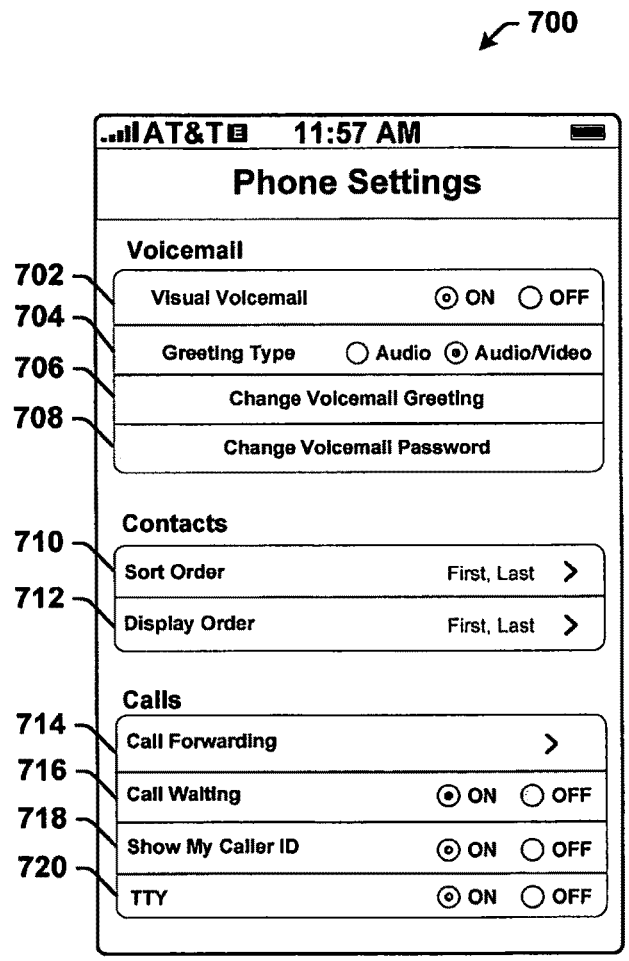
FIG. 7 illustrates a graphical user interface (GUI) menu for providing an option to change a voicemail greeting type and voicemail greeting from a mobile device that supports video greetings, according to an exemplary embodiment of the present disclosure.

Referring now to FIG. 7, a graphical user interface (GUI) 700 for providing an option to change a voicemail greeting type and voicemail greeting from a mobile device 200 that supports video greetings is illustrated, according to an exemplary embodiment of the present disclosure. The GUI 700 can include a visual voicemail toggle option 702, a change voicemail greeting type option 704, a change voicemail greeting option 706, and a change voicemail password option 708. The visual voicemail toggle option 702 allows a user to toggle VVM on and off. For example, a user may desire to turn VVM off when roaming internationally due to the possible high costs associated with international data roaming. The change voicemail greeting type option 704 allows a user to choose between an audio-only voicemail greeting and an audio/video voicemail greeting. Although not illustrated, text greeting are also possible and can be included in some embodiments of the present disclosure. As illustrated, the audio/video option is selected and, accordingly, the VMS 110 can be notified that the video voicemail greeting is enabled for the user's voicemail account. The change voicemail greeting option 706 can allow the user to change an audio and/or audio/video voicemail greeting on the device 200. The change voicemail password option 708 can allow the user to change the voicemail password associated with their VVM service on the device 700.

The illustrated GUI 700 also includes a sort order option 710 whereby the user can select the order by which contacts are sorted, and a display order option 712 whereby the user can select the order by which contacts are displayed. The illustrated GUI 700 further includes a call forwarding option 714 whereby the user can select at least one call forwarding number, a call waiting option 716 whereby the user can enable/disable a call waiting feature, a "show my caller ID" option 718 whereby the user can enable/disable a caller ID feature, and a TTY option 720 whereby the user can enable/disable a TTY feature.

Figure 8:
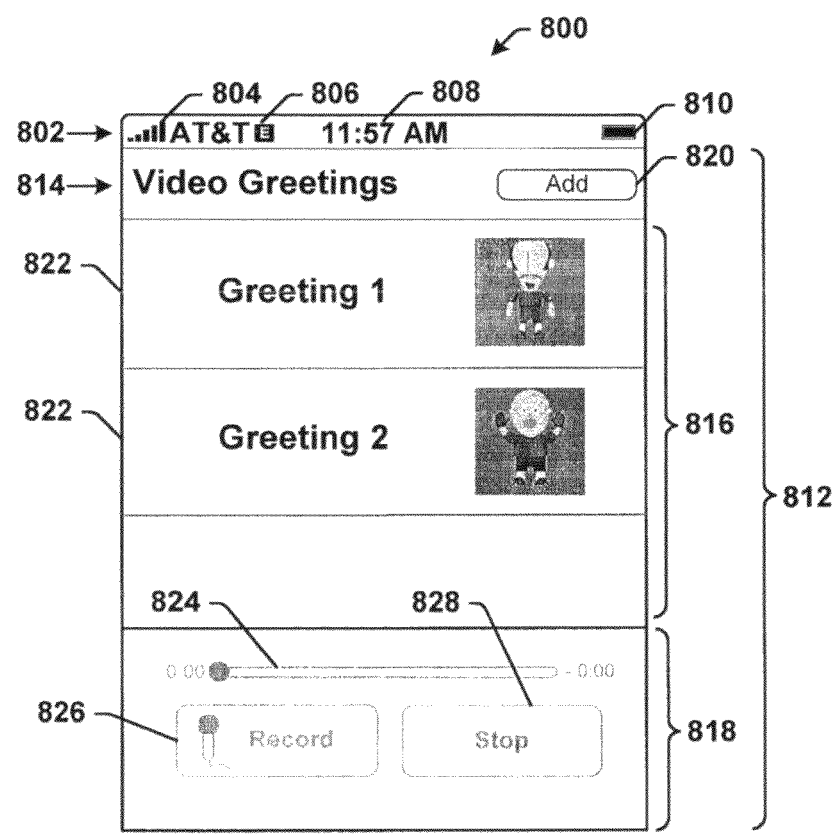
FIG. 8 illustrates a GUI for managing voicemail greetings on a mobile device that supports video greetings, according to an exemplary embodiment of the present disclosure.

Referring now to FIG. 8, a GUI 800 for managing voicemail greetings on a mobile device 200 that supports video greetings is illustrated, according to exemplary embodiment of the present disclosure. The illustrated GUI 800 can include operational information 802 for a device 200. The operational information 802 can include network information, for example, a signal meter 804 for displaying the measured strength of a network signal, and a network indicator 806 for displaying the current network to which the device 200 is connected. In the illustrated GUI 800, the device 200 is indicating a maximum signal strength and that the device 200 is currently connected to the AT&T EDGE network. It should be understood that this indication is exemplary only. The GUI 800 can be used on devices operating on other network and operated by other carriers. The operational information 802 can also include, for example, the time of day 808, a battery meter 810, as well as other indicators, including, but not limited to, a short range radio communications indicator, an alarm indicator, a date, and the like.

In the illustrated GUI 800, an exemplary user interface portion 812 includes a title and menu portion 814, a greeting portion 816, and a control portion 818. As illustrated, the title and menu portion 814 can include one or more options 820, such as the illustrated option 820 to add a new video greeting, though the illustrated option is merely exemplary. The greeting portion 816 can include one or more saved video greetings 822 through which a user can select a saved video greeting to assign to one or more contacts in a contact list and/or as a generic video greeting. The illustrated video greetings 822 include a "thumbnail" preview image of the greeting, though this is not necessarily the case. The control portion 818 can include a time slider bar 824, a record option 826, and a stop recording option 828. The record option 826 can be used to initiate a recording session during which a user can record a video greeting on the device 200. The user can select the stop recording option 828 to stop recording.

The GUI 800 can further include an option to translate the audio of a video greeting to one or more languages, an option to rename a video greeting, an option to upload a video greeting, an option to edit the video greeting, an option to listen to or view a video greeting, and/or an option to delete a video greeting. Changes made to one or more video greetings on the mobile device 200 can be automatically or manually updated on the VMS 110. An option to toggle this feature can be provided, for example, in the GUI 700.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for operating a voicemail system, the method comprising:
    receiving a call at the voicemail system from a calling party device associated with a calling party;
    determining if a video greeting, to be played to the calling party in solicitation of a voice message from the calling party, is stored on the calling party device, wherein the video greeting is associated with a called party device;
    sending a video greeting identifier to the calling party device, the video greeting identifier being associated with a called party and used to identify the video greeting stored on the calling party device to cause the calling party device to play the video greeting to the calling party in solicitation of a voice message from the calling party; and
    recording a voicemail message from the calling party.

2. The method of claim 1, wherein recording the voicemail message comprises recording the voicemail message having been received in response to the video greeting being played on the calling party device.

3. The method of claim 1, further comprising determining if a video greeting feature is enabled for a voicemail account associated with the called party.

4. The method of claim 1, wherein determining if the video greeting is stored on the calling party device comprises determining if the video greeting is available based upon video greeting information comprising an MSISDN of the calling party and an indication as to whether the video greeting has been saved on the calling party device.

5. The method of claim 4, wherein the video greeting information is retrieved from at least one of the voicemail system, a subscriber database, a database, a server, and a network entity.

6. The method of claim 1, wherein determining if the video greeting is stored on the calling party device comprises querying the calling party device to determine if the video greeting is available.

7. The method of claim 1, further comprising:
    determining whether the calling party device is compatible with a video greeting feature; and
    in response to determining that the calling party device is not compatible with the video greeting feature, playing, by the voicemail system, an audio greeting.

8. The method of claim 7, wherein the voicemail system records a voicemail message received in response to the audio greeting.

9. The method of claim 1, further comprising if the video greeting is not stored on the calling party device, sending, via the voicemail system, the video greeting to the calling party device.

10. A method for operating a mobile device, the method comprising:
    receiving, at a calling party device associated with a calling party, a video greeting identifier, wherein the video greeting identifier corresponds to a called party;
    retrieving, at the calling party device from within the calling party device in a retrieval act using the video greeting identifier, a pre-stored video greeting, the pre-stored video greeting to be played to the calling party in solicitation of a voice message from the calling party, wherein the pre-stored video greeting is associated with a called party device; and
    following the retrieval act, providing the video greeting to the calling party.

11. A non-transitory computer-readable storage medium, for use in a voicemail system, comprising instructions executable by a processor to cause the processor to perform operations comprising:
    receiving a call at the voicemail system from a calling party device associated with a calling party;
    determining if a video greeting to be played to the calling party in solicitation of a voice message from the calling party, is stored on the calling party device, wherein the video greeting is associated with a called party device;
    sending a video greeting identifier to the calling party device, the video greeting identifier being used to identify the video greeting stored on the calling party device to cause the calling party device to play the video greeting to the calling party in solicitation of a voice message from the calling party; and
    recording a voicemail message from the calling party.

* * * * *